United States Patent
Stack et al.

(10) Patent No.: US 7,261,355 B2
(45) Date of Patent: Aug. 28, 2007

(54) AUTOMOTIVE MOVABLE CENTER STACK PANEL WITH MOVING PANEL AND FOUR BAR HIDDEN LINKAGE

(75) Inventors: Robert Mark Stack, Livonia, MI (US); James Bernard Wright, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 522 days.

(21) Appl. No.: 10/711,452

(22) Filed: Sep. 20, 2004

(65) Prior Publication Data

US 2006/0060620 A1    Mar. 23, 2006

(51) Int. Cl.
*B60N 3/12* (2006.01)

(52) U.S. Cl. ............... 296/37.12; 296/24.32; 296/70

(58) Field of Classification Search ............. 296/37.12, 296/24.34, 70
See application file for complete search history.

(56) References Cited

U.S. PATENT DOCUMENTS

| | | | |
|---|---|---|---|
| 6,045,173 A * | 4/2000 | Tiesler et al. ............... 296/37.8 |
| 6,176,534 B1 | 1/2001 | Duncan |
| 6,203,088 B1 * | 3/2001 | Fernandez et al. ....... 296/24.34 |
| 6,354,649 B1 | 3/2002 | Lee |
| 6,419,314 B1 * | 7/2002 | Scheerhorn ................ 296/37.8 |
| 6,428,072 B1 * | 8/2002 | Moore ......................... 296/70 |
| 6,435,587 B1 * | 8/2002 | Flowerday et al. ........ 296/37.8 |
| 6,616,206 B2 * | 9/2003 | Luginbill et al. .......... 296/37.8 |
| 6,666,492 B1 | 12/2003 | Schmidt et al. |
| 6,709,041 B1 | 3/2004 | Hotary et al. |
| 6,719,343 B2 * | 4/2004 | Emerling et al. ........ 296/24.34 |
| 6,932,402 B2 * | 8/2005 | Niwa et al. .............. 296/24.34 |
| 7,063,370 B2 * | 6/2006 | Schmidt et al. ............... 296/70 |
| 7,163,249 B2 * | 1/2007 | Schmidt et al. .......... 296/37.12 |
| 7,168,750 B2 * | 1/2007 | Hutek et al. ............. 296/24.34 |
| 2002/0003354 A1 | 1/2002 | Inoue et al. |
| 2003/0197392 A1 | 10/2003 | Clark et al. |
| 2004/0041426 A1 | 3/2004 | Lee |
| 2006/0066120 A1 * | 3/2006 | Svenson et al. ......... 296/37.12 |

* cited by examiner

*Primary Examiner*—Kiran B. Patel
(74) *Attorney, Agent, or Firm*—Earl LaFontaine

(57) ABSTRACT

An automotive center stack panel assembly is provided comprising an automotive instrument panel assembly having a recessed display chamber. A video display panel assembly is mounted within the recessed display chamber. A rear pivot link assembly is included having a rear first fixed pivot end rotatably mounted to the automotive instrument panel assembly and a rear second fixed pivot end. A forward pivot link assembly is included having a forward first fixed pivot end rotatably mounted to the automotive instrument panel assembly and a forward second pivot end. A control panel includes an upper control panel end and a lower control panel end and a control panel slot guide. The rear second fixed pivot end rotatably is mounted to the upper control panel end and the forward second pivot end slidably is mounted within said control panel slot guide. The rear pivot link assembly and the forward pivot link assembly allow the control panel to rotate such that the control panel is pivotable between a display hidden position and a display exposed position. The control panel covers the recessed display chamber when in the display hidden position.

20 Claims, 2 Drawing Sheets

US 7,261,355 B2

AUTOMOTIVE MOVABLE CENTER STACK PANEL WITH MOVING PANEL AND FOUR BAR HIDDEN LINKAGE

TECHNICAL FIELD

The present invention relates generally to an automotive center stack panel with hidden display and more particularly to an automotive center stack panel with hidden display utilizing a moving panel and four bar hidden linkage.

BACKGROUND OF THE INVENTION

Automotive dash and control panels have been designed to incorporate an ever increasing array of controls and features. The increasing number of features has placed an increased value on instrument panel real estate. Increased density of controls and displays can hamper operator interaction. It is preferably for such interactions to be simplified so as to minimize distraction from primary vehicle operation. Under these desirable design constraints, automotive designers are now directed to incorporate navigation and other video displays into the already burdened center stack panels.

The video displays must be a reasonable dimension to facilitate easy visibility for a range of occupant sizes and proportions. The dimensions suitable for proper viewing can require a significant region of the center stack panel. Additionally, mounting a video display on the outer surface of the center stack panel often produces viewing angles that are poorly optimized for operation viewing. In this fashion, incorporation of video displays into the center stack or other vehicle control regions provides a significant challenge to automotive designers. It would be highly desirable to have a video display that provided a wide range of visibility for various occupants without resulting in an overly increased density of additional controls and features.

An additional challenge regarding video displays stems from the nature of their use within the automotive environment. Use for navigation and entertainment often only represents a small portion of vehicle operational time. During the remaining portions of time when the displays are not utilized they represent underutilized space within the vehicle interior. They may also create an undesirable appearance or distraction when they are not in operation. It would, therefore, be highly desirable to have a video display that only usurped valuable panel space when in operation.

SUMMARY OF THE INVENTION

It is, therefore, an object of the present invention to provide an automotive center stack panel with hidden display. It is a further object of the present invention to provide such an automotive center stack panel which minimizes the impact of the display on control feature density.

An automotive center stack panel assembly is provided comprising an automotive instrument panel assembly having a recessed display chamber. A video display panel assembly is mounted within the recessed display chamber. A rear pivot link assembly is included having a rear first fixed pivot end rotatably mounted to the automotive instrument panel assembly and a rear second fixed pivot end. A forward pivot link assembly is included having a forward first fixed pivot end rotatably mounted to the automotive instrument panel assembly and a forward second pivot end. A control panel includes an upper control panel end and a lower control panel end and a control panel slot guide. The rear second fixed pivot end rotatably is mounted to the upper control panel end and the forward second pivot end slidably is mounted within said control panel slot guide. The rear pivot link assembly and the forward pivot link assembly allow the control panel to rotate such that the control panel is pivotable between a display hidden position and a display exposed position. The control panel covers the recessed display chamber when in the display hidden position.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
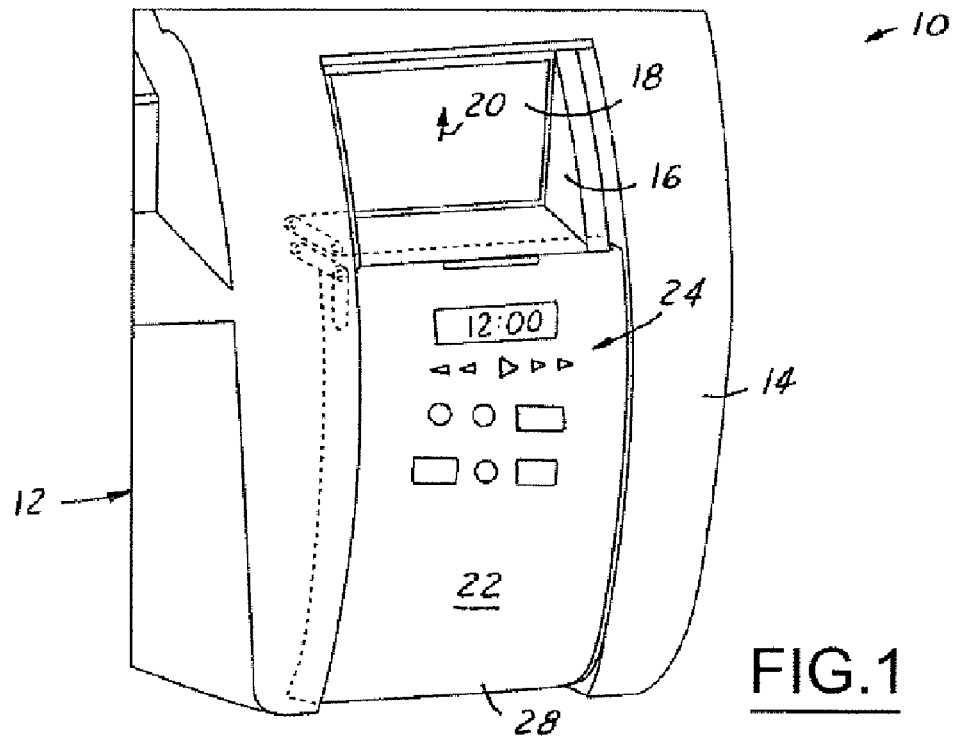
FIG. 1 is an illustration of an automotive center stack panel assembly in accordance with the present invention, the automotive center stack panel assembly illustrated in the display exposed position.

Referring now to FIG. 1, which is an illustration of an automotive center stack panel assembly 10 in accordance with the present invention. The automotive center stack panel assembly 10 illustrated is intended to encompass a wide variety of instrument panel assemblies suitable for automotive applications. As such, the automotive center stack panel assembly 10 includes an automotive instrument panel assembly 12 having an instrument panel outer surface 14. Such instrument panel assembles 12 are known outer finish elements within the automotive industry. The present invention, however, further includes a recessed display chamber 16 formed into the automotive instrument panel assembly 12. A video display panel assembly 18 is mounted at the rear of the recessed display chamber 16. This allows the video display view orientation 20 to be optimized for any occupants without regard to the contour of the instrument panel outer surface 14. It is contemplated that the video display panel assembly 18 may encompass a wide variety of applications, although a navigation system or audio system is preferred.

Figure 2:
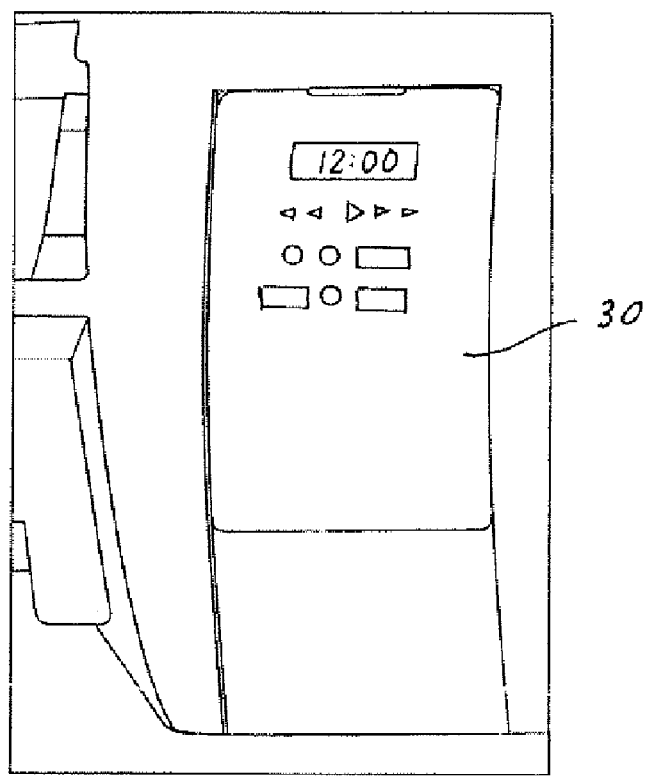
FIG. 2 is an illustration of the automotive center stack panel assembly illustrated in FIG. 1, the automotive center stack panel assembly illustrated in the display hidden position.

The present invention allows for selective use of the video display panel assembly 18 through the use of a control panel 22 pivotably mounted to the instrument panel assembly 12. Control panels 22 are known to provide access to a variety of controls and features within the automotive environment. The control panel 22 includes a plurality of control buttons 24 positioned on the control panel outer surface 26. The control panel 22 is pivotably movable between a display exposed position 28 and a display hidden position 30 (see FIG. 2). In the display hidden position 30 the control panel 22 moves upward to completely cover the recessed display chamber 16. This provides a plurality of benefits. By covering the recessed display chamber 16, the control panel 22 prevents the video display panel assembly 18 from becoming a distraction or giving an unsightly appearance when not activated. Additionally, by moving upward into the display hidden position 30, the control panel 22 moves the plurality of control buttons 24 upwards where they may be more easily accessed by a vehicle operator. The control panel 22 preferably moves between the display hidden position 30 and the display exposed position 28 while the control outer surface 26 remains coincident with the instrument panel outer surface 24. This insures a positive finish appearance in both positions while more effectively hiding the recessed display chamber 16 when in the display hidden position 28.

Figure 3:
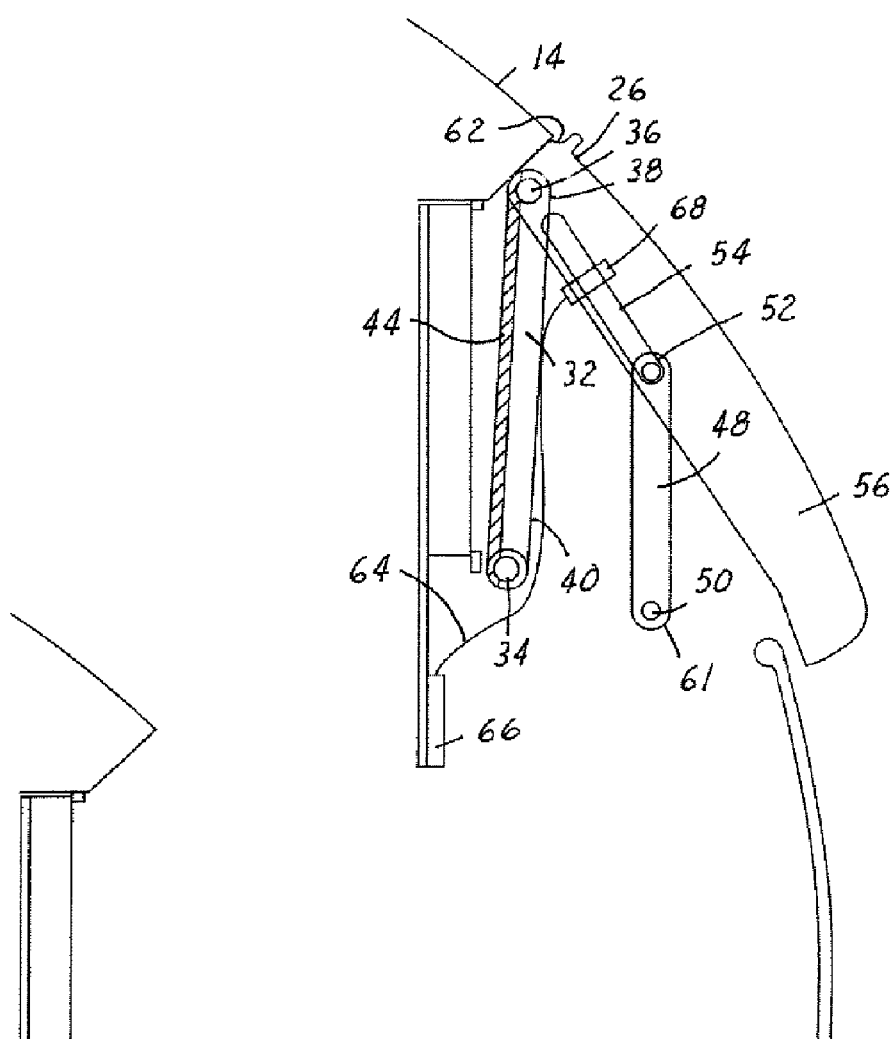
FIG. 3 is a cross-sectional illustration of the automotive center stack panel assembly illustrated in FIG. 2.
Figure 4:
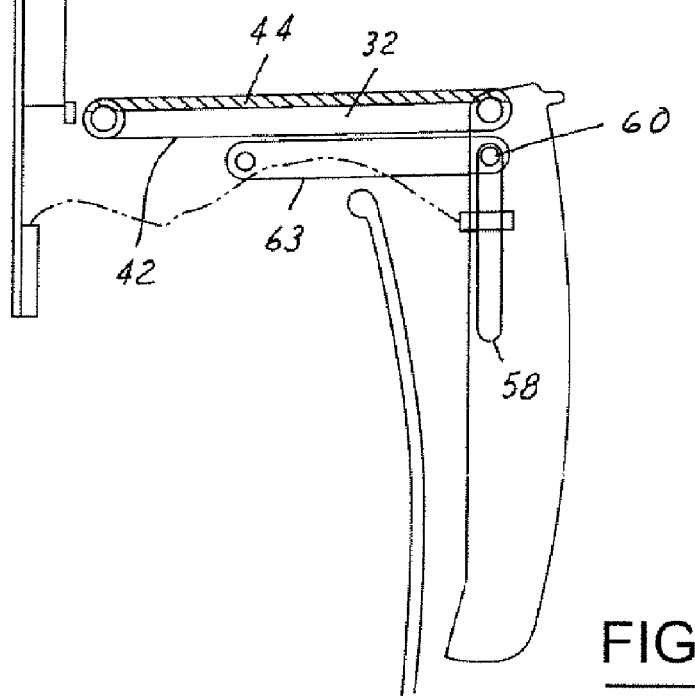
FIG. 4 is a cross-sectional illustration of the automotive center stack panel assembly illustrated in FIG. 1.

The present invention controls movement of the control panel 22 through a unique mechanical configuration illustrated in FIGS. 3 and 4. The present invention includes a rear pivot link assembly 32 connecting the control panel 22 to the instrument panel assembly 12. The rear pivot link assembly 32 may comprise a pair of rear pivot links formed on the sides of the control panel 22. The rear pivot link assembly 32 includes a rear first fixed pivot end 34 rotatably mounted to the instrument panel assembly 12. The rear pivot link assembly 32 further includes a rear second fixed pivot end 36 rotatably mounted to a control panel upper region 38. The rear pivot link assembly 32 is rotatable between a vertical rear pivot stowed position 40 and a horizontal rear pivot deployed position 42. A linkage panel 44 may be mounted to the rear pivot link assembly 32 such that the linkage panel 44 forms a shelf 46 in the recessed display chamber 16 when the control panel 22 is in the display exposed position 28.

The present invention further contemplates the use of a forward pivot link assembly 48 positioned forward of said rear pivot link assembly 32. The forward pivot link assembly 48 includes a forward first fixed pivot end 50 rotatably mounted to the instrument panel assembly 12 and a forward second pivot end 52 slidably engaging the control panel 22. This is accomplished preferably by way of a control panel slot guide 54 formed in the side control panel surface 56. The forward second pivot end 52 is preferably slidably retained within this slot guide 54 such that it moves between a lower slot guide end 58 (when said control panel 22 is in the display hidden position 30) and an upper slot guide end 60 (when said control panel 22 is in the display exposed position 28). This allows rotation of the control panel 22 while maintaining the orientation of the control panel outer surface 26 relative to the instrument panel outer surface 14. The forward pivot link assembly 48 is thereby rotatable between a vertical forward pivot stowed position 61 and a horizontal forward pivot deployed position 63. An upper engagement element 62 may be utilized to frictionally engage the control panel 22 to retain it in the display hidden position 30 until an operator effectuates movement. Stopping of the control panel 22 in the display exposed position 28 may be accomplished by a combination of the forward second pivot end 52 reaching the upper slot guide end 60 and the rear pivot link assembly 32 coming to rest on the forward pivot link assembly 48.

An additional feature of the present invention is a flexible electronics cable 64 providing communication between the video display panel assembly 18 and the control panel 22. The flexible electronics cable 64 has a first cable end 66 in communication with the video display panel assembly 18 and a second cable end 68 in communication with the control panel 22. This allow the plurality of control buttons 24 to control the video display panel assembly 18 in either the display exposed position 28 or the display hidden position 30. Additionally, the use of the linkage panel 44 protects and hides from view the flexible electronics cable 64 when the control panel 22 is in the display exposed position 28. This provides a unique and effective mechanical connection between the control panel 22 and the video panel display assembly 18.

While particular embodiments of the invention have been shown and described, numerous variations and alternative embodiments will occur to those skilled in the art. Accordingly, it is intended that the invention be limited only in terms of the appended claims.

What is claimed is:

1. An automotive center stack panel assembly comprising:
   an automotive instrument panel assembly;
      a recessed display chamber formed in said instrument panel assembly;
      a video display panel assembly mounted within said recessed display chamber;
      a rear pivot link assembly having a rear first fixed pivot end rotatably mounted to said automotive instrument panel assembly and a rear second fixed pivot end;
      a forward pivot link assembly having a forward first fixed pivot end rotatably mounted to said automotive instrument panel assembly and a forward second pivot end; and
      a control panel having an upper control panel end and a lower control panel end and a control panel slot guide, said rear second fixed pivot end rotatably mounted to said upper control panel end, said forward second pivot end slidably mounted within said control panel slot guide, said rear pivot link assembly and said forward pivot link assembly allowing said control panel to rotate such that said control panel is pivotable between a display hidden position and a display exposed position, said control panel covering said recessed display chamber when in said display hidden position.

2. An automotive center stack panel assembly as described in claim 1, wherein said control panel includes a control panel outer surface generally coincident with an instrument panel outer panel surface when said control panel is in said display hidden position.

3. An automotive center stack panel assembly as described in claim 1, further comprising:
   a linkage panel mounted to said rear pivot link assembly, said linkage panel forming a shelf in said recessed display chamber when said control panel is in said display exposed position.

4. An automotive center stack panel assembly as described in claim 1, further comprising:
   at least one upper engagement element frictionally engaging said control panel when said control panel is in said display hidden position.

5. An automotive center stack panel assembly as described in claim 1, further comprising:
   a flexible electronics cable having a first cable end mounted to said video display panel assembly and a second cable end mounted to said control panel.

6. An automotive center stack panel assembly as described in claim 5, further comprising:
   a linkage panel mounted to said rear pivot link assembly, said linkage panel forming a shelf in said recessed display chamber when said control panel is in said display exposed position, said linkage panel hiding said flexible electronics cable when in said display exposed position.

7. An automotive center stack panel assembly as described in claim 1, further comprising:
   a plurality of control buttons positioned on a control panel outer surface.

8. An automotive center stack panel assembly as described in claim 1, wherein said video display panel assembly comprises a navigation system.

9. An automotive center stack panel assembly as described in claim 1, wherein said rear pivot link assembly rests on said forward pivot link assembly when in said display exposed position.

10. An automotive center stack panel assembly as described in claim 5, further comprising:
a plurality of control buttons positioned on a control panel outer surface, said flexible electronics cable in communication with said plurality of control buttons and said video display panel assembly such that said plurality of control buttons may be utilized to control said video display panel assembly.

11. An automotive center stack panel assembly comprising:
an automotive instrument panel assembly;
a recessed display chamber formed in said instrument panel assembly;
a video display panel assembly mounted within said recessed display chamber;
a rear pivot link assembly having a rear first fixed pivot end rotatably mounted to said automotive instrument panel assembly and a rear second fixed pivot end, said rear pivot link assembly rotatable between a vertical rear pivot stowed position and a horizontal rear pivot deployed position;
a forward pivot link assembly having a forward first fixed pivot end rotatably mounted to said automotive instrument panel assembly and a forward second pivot end, said forward pivot link assembly rotatable between a vertical forward pivot stowed position and a horizontal forward pivot deployed position;
a control panel having an upper control panel end and a lower control panel end and a control panel slot guide, said rear second fixed pivot end rotatably mounted to said upper control panel end, said forward second pivot end slidably mounted within said control panel slot guide, said rear pivot link assembly and said forward pivot link assembly allowing said control panel to rotate such that said control panel is pivotable between a display hidden position and a display exposed position, said control panel covering said recessed display chamber when in said display hidden position; and
a plurality of control buttons positioned on a control panel outer surface.

12. An automotive center stack panel assembly as described in claim 11, wherein said control panel includes a control panel outer surface generally coincident with an instrument panel outer panel surface when said control panel is in said display hidden position.

13. An automotive center stack panel assembly as described in claim 11, further comprising:
a linkage panel mounted to said rear pivot link assembly, said linkage panel forming a shelf in said recessed display chamber when said control panel is in said display exposed position.

14. An automotive center stack panel assembly as described in claim 11, further comprising:
a flexible electronics cable having a first cable end mounted to said video display panel assembly and a second cable end mounted to said control panel, said flexible electronics cable in communication with said control panel and said video display panel assembly such that said control panel may be utilized to control said video display panel assembly.

15. An automotive center stack panel assembly as described in claim 11, wherein said rear pivot link assembly rests on said forward pivot link assembly when in said horizontal rear pivot deployed position.

16. An automotive center stack panel assembly as described in claim 11, wherein forward second pivot end slides between a lower slot guide end and an upper slot guide end as said forward pivot link assembly is moved from said vertical forward pivot stowed position to said horizontal forward pivot deployed position.

17. An automotive center stack panel assembly as described in claim 14, further comprising:
a linkage panel mounted to said rear pivot link assembly, said linkage panel forming a shelf in said recessed display chamber when said control panel is in said display exposed position, said linkage panel hiding said flexible electronics cable when in said display exposed position.

18. A method of accessing a video display panel assembly within an automotive center stack panel assembly comprising:
pivoting a control panel from a display hidden position to a display exposed position thereby exposing a video display panel assembly mounted within a recessed display chamber, said control panel rotatably engaged to an automotive instrument panel assembly by way of a rear pivot link assembly and a forward pivot link assembly, said rear pivot link assembly having a rear first fixed pivot end rotatably mounted to said automotive instrument panel assembly and a rear second fixed pivot end rotatably mounted to an upper control panel end, said forward pivot link assembly having a forward first fixed pivot end rotatably mounted to said automotive instrument panel assembly and a forward second pivot end slidably mounted within a control panel slot guide formed on said control panel; and
rotating said control panel from said display exposed position to said display hidden position to cover said video display panel assembly when said video display panel assembly is not in use.

19. A method as described in claim 18, further comprising:
controlling said video display panel assembly using a plurality of control buttons positioned on a control panel outer surface, said plurality of control buttons communicating with said video display panel assembly by way of a flexible electronics cable connecting said control panel assembly to said video display panel assembly.

20. A method as described in claim 19, further comprising;
hiding said flexible electronics cable using a linkage panel mounted to said rear pivot link assembly, said linkage panel forming a shelf in said recessed display chamber when said control panel is in said display exposed position.

* * * * *